United States Patent

[11] 3,614,628

[72] Inventor Robert S. Ringland
Burlington, Iowa
[21] Appl. No. 781,392
[22] Filed Dec. 5, 1968
[45] Patented Oct. 19, 1971
[73] Assignee Antennacraft Company
Burlington, Iowa

[54] UHF-VHF ANTENNA PREAMPLIFIER
4 Claims, 3 Drawing Figs.

[52] U.S. Cl. .... 325/365
[51] Int. Cl. .... H04b 1/18
[50] Field of Search .... 325/365, 308; 178/6 PD; 330/126, 117

[56] References Cited

UNITED STATES PATENTS

| | | | |
|---|---|---|---|
| 2,757,244 | 7/1956 | Tomcik | 330/126 |
| 3,281,705 | 10/1966 | Frye | 330/126 |
| 2,178,453 | 10/1939 | Leibe | 330/117 |

*Primary Examiner*—Robert L. Griffin
*Assistant Examiner*—Anthony H. Handal
*Attorney*—Hood, Gust, Irish and Lundy

ABSTRACT: This invention relates to a preamplifier which may be attached directly to an antenna adapted to receive both UHF and VHF television signals. Within the preamplifier there are two stages of amplification and a signal separation network adapted to separate the VHF signals from the UHF signals for individual treatment. The two amplifiers are arranged in successive stages, with the first stage being coupled directly to the antenna terminals. This first amplifier is adapted to amplify both the UHF and VHF signals. A signal-separating network is coupled between the two amplifiers and contains two networks, each adapted to readily pass one of the UHF and VHF signals and drastically attenuate the other. The UHF network is connected between the output circuit of the first amplifier and the input circuit of the second amplifier, the second amplifier being designed to provide maximum gain of the UHF signals. The VHF circuit is coupled between the output circuits of both amplifiers. The amplified UHF signals from the output circuit of the second amplifier are combined in a signal-combining circuit with the VHF signals from the first amplifier, and these in turn are coupled to an impedance-matching network designed to be connected directly to a twin lead transmission line which leads to the television receiver. By providing the signal-separating network in the output circuit of the first amplifier, the inherent noise therein will not be amplified initially. Therefore, there results the application of an amplified television signal to the transmission line having a higher signal-to-noise ratio than would have been obtained had the signal separation taken place in the input circuit of the first amplifier.

INVENTOR.
ROBERT S. RINGLAND,
BY Hood, Gust, Irish & Lundy
ATTORNEYS.

UHF-VHF ANTENNA PREAMPLIFIER

BACKGROUND OF THE INVENTION

1. Field of the Invention

The present invention relates to preamplifiers adapted to be coupled to television Of The Prior Art particularly to a preamplifier designed to handle both UHF and VHF signals.

2. Description of the Prior Art

Preamplifiers for handling both UHF and VHF signals heretofore have included a signal-separating network which is directly coupled to the antenna terminals for separating the UHF and VHF signals prior to amplification. The inherent noise in such a signal-separation network is, therefore, amplified by the first stage of amplification in the preamplifier which results in deterioration of the signal-to-noise ratio of the signals being fed to the television receiver. The present invention is so arranged as to avoid first stage amplification of the inherent noise in the signal-separation network and thereby improve the overall signal-to-noise ratio of the described device.

SUMMARY OF THE INVENTION

In accordance with the broader aspects of this invention, there is provided a preamplifier which can be attached directly to the antenna structure itself and electrically connected directly to the antenna terminals. The preamplifier has two stages of amplification in which the first stage amplifies both the UHF and VHF signals and the second stage only the UHF signals. A signal-separation network is interposed between the two stages, the UHF branch thereof being connected to the output circuit of the first amplifier and to the input circuit of the second amplifier. Thus, the second amplifier amplifies only the UHF signals. The VHF branch is connected to the output circuit of the first amplifier and leads to a signal-combining circuit which is also coupled to the output circuit of the second amplifier so as to provide amplified UHF and VHF signals to terminals which may be connected to the transmission line leading to the receiver.

It is an object of this invention to provide a UHF-VHF preamplifier for television signals which may be directly attached to an antenna structure and feed both UHF and VHF signals to a television receiver with improved signal-to-noise ratio in at least the UHF portion of the frequency spectrum.

It is another object of this invention to provide in a UHF-VHF television amplifier improvements in the UHF-VHF signal separation whereby the inherent noise therein may be minimized.

It is yet another object of this invention to provide a UHF-VHF preamplifier which contains a minimum number of components but yet achieves greater efficiency of operation.

The above-mentioned and other features and objects of this invention and the manner of attaining them will become more apparent and the invention itself will be best understood by reference to the following description of an embodiment of the invention taken in conjunction with the accompanying drawings, wherein:

The VHF television spectrum includes frequencies in the range of from 54 to 88 and 174 to 216 megahertz, FM broadcast from 88 to 108 megahertz, while the UHF covers the range from 470 to 890 megahertz. Preamplifiers of the type contemplated by this invention are fixedly attached to the antenna so as to amplify the received signals at the antenna terminals and then feed the amplified signals to the transmission line which is connected to the television receiver at a remote point. This is a superior method of utilizing a preamplifier over arrangements in which the preamplifier is attached to the terminals of the television receiver with the long length of transmission line leading from this preamplifier to the antenna mounted a relatively great distance away from the receiver. The reason for this is that with the amplifier mounted on the antenna terminals, the signal-to-noise ratio of the signal arriving at the receiver terminals is greater than would be true if the preamplifier were mounted directly on the receiver. Every transmission line picks up a certain amount of noise, such that if the amplifier is mounted on the receiver itself, such noise will be amplified along with the desired signal. With the amplifier mounted on the antenna terminals, the desired signal is fed to the transmission line at a much higher level, such that the noise picked up by the transmission line is not amplified and is thereby small in comparison to that signal which eventually arrives at the television receiver.

Figure 1:
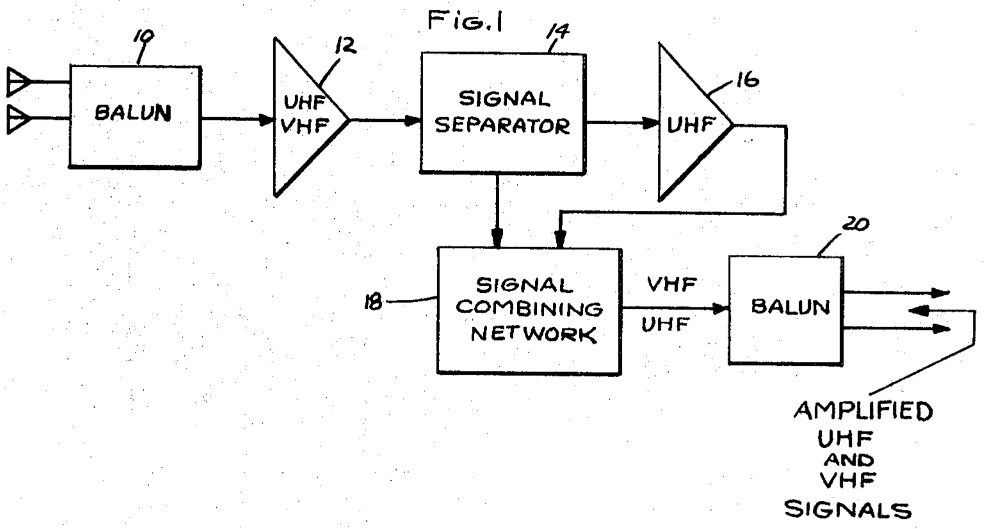
FIG. 1 is a block diagram of one embodiment of this invention.
Figure 2:
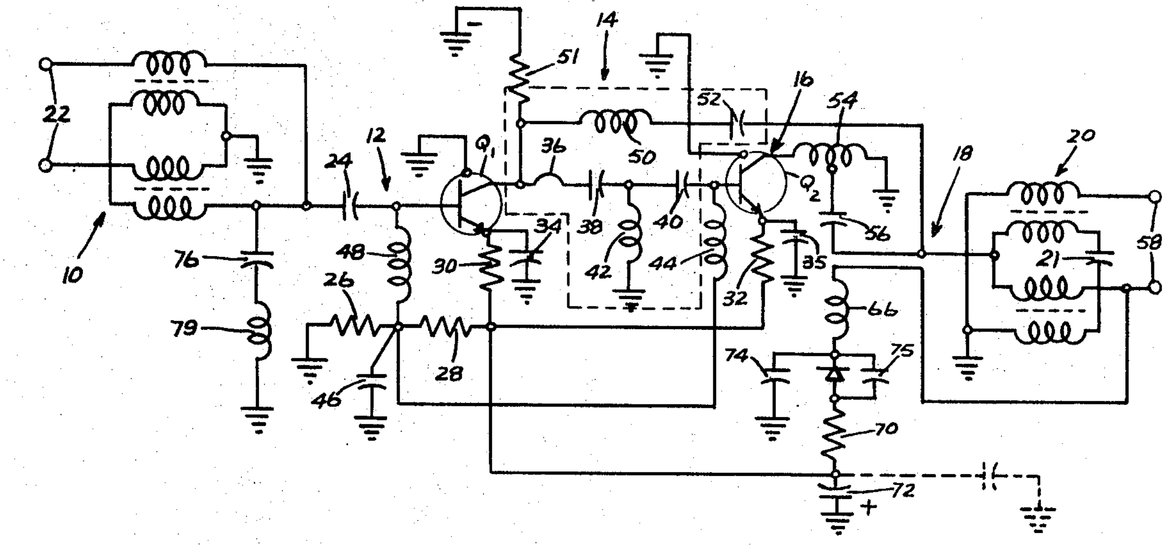
FIG. 2 is a schematic diagram thereof.

The preamplifier is shown in block diagram form in FIG. 1 and includes an impedance-matching balun 10, a first stage of amplification 12, a signal-separation network 14, a second stage of UHF signal amplification 16, a signal-combining network 18 and another impedance-matching balun 20. The same numerals identify the equivalent circuitry in FIG. 2. As shown in FIG. 2, the balun 10 includes the usual set of inductors having connections to two terminals 22 which are adapted to be connected directly to an antenna adapted to receive both UHF and VHF television signals (as well as FM signals, if desired). Ordinarily, such an antenna at the terminals thereof has an impedance of about 300 ohms, such that the balun 10 is so designed as to match this impedance. The output portion of the balun 10 is connected to the base of a transistor Q1 by means of a capacitor 24. A voltage divider composed of two series-connected resistors 26 and 28 are connected between ground and the emitters of the two transistors Q1 and Q2 as shown, emitter resistors 30 and 32 being connected between the voltage divider and the respective emitters. The emitter of transistor Q1 is bypassed to ground by means of the capacitor 34.

To the collector of Q1 is connected the signal-separation circuit 14 which is in two branches, the first being composed of a small inductor 36, a capacitor 38, another capacitor 40 and an inductor 42 connected between ground and the junction between the two capacitors 38 and 40. The capacitor 40 is also connected to the base of transistor 16. An inductor 44 is connected between the same base and the junction of the voltage-dividing resistors 26 and 28. This same junction is bypassed to ground by means of a capacitor 46. Another inductor 48 is connected between this junction and the base of transistor Q1.

The second branch of the signal-separation network 14 includes an inductor 40 connected in series with a capacitor 52. The branch extending between the collector of Q1 and the base of transistor Q2 actually constitutes a filter circuit which passes only the UHF signals, the capacitors 38 and 40 presenting a high impedance to the VHF signals but a low impedance to UHF signals. The addition of the inductor 42 serves to peak the response in the UHF spectrum at the upper end thereof so as to provide for a more level response in the UHF spectrum. Thus, this branch, 36, 38, 40, 42 may be referred to as the UHF branch.

The other branch 50, 52 is so designed as to have a high impedance to UHF signals but a low impedance to VHF signals. The inductor 50 has such an impedance characteristic and serves in conjunction with the capacitor 52 as a series resonant network having greater response in the VHF spectrum.

To the collector of the transistor Q2 is connected an inductor 54 tuned to the UHF spectrum. Tapped from one of the turns on this inductor 54 is a capacitor 56 which leads to the balun 20. It will here be noted that the VHF circuit 50, 52 is joined with the capacitor 56 on the balun side thereof to provide a signal-combining network 18. The balun 20 is designed to match the impedance of the circuits connected thereto to the impedance of the transmission line which will be connected to the output terminals 58, the impedance of this transmission line quite commonly being 300 ohms.

Figure 3:
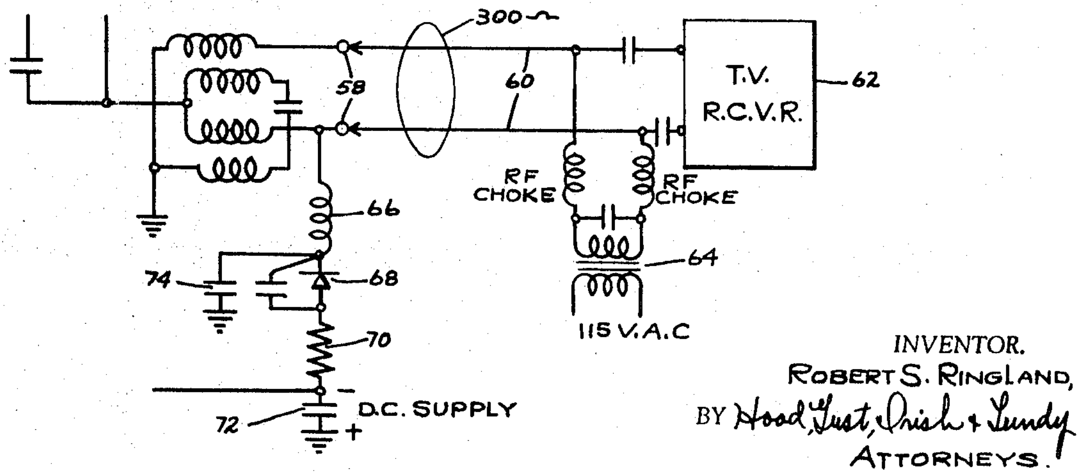
FIG. 3 is a fragmentary schematic diagram showing the circuitry for supplying operating potentials to the arrangement of FIG. 2.

Such a transmission line is indicated by reference numeral 60 in FIG. 3, a television receiver 62 being indicated as being connected to the distal end thereof at a remote location. The power supply for operating the amplifier of FIG. 2 is shown in FIG. 3 as including a stepdown transformer 64 having a 15-volt secondary connected to the transmission line near the antenna terminals of the television receiver 62. Capacitor isolate the secondary from the television receiver as shown. In the preamplifier itself is mounted a circuit which includes an inductor 66, a rectifier 68, a resistor 70 and a filter capacitor 72 all connected in series between one of the terminals 58 and ground. Another capacitor 74 connects between one side of the rectifier 68 and ground as shown. About 10 volts DC is supplied to the amplifier circuitry by this power supply. The amplitude of the DC is a function of the I.R. drop of resistor 70.

In operation, UHF signals and VHF signals applied to the terminals 22 are jointly amplified by the amplifier 12. The amplified signals are then separated into UHF and VHF components, the UHF component being coupled to the base of the amplifier 16 and there amplified and the VHF being transmitted via the VHF circuit 50, 52 to the signal-combining network 18. Both the UHF and VHF signals are then connected to the transmission line 60 leading to the television receiver 62 by means of the impedance-matching balun 20.

It is unique to locate the signal-separation network 14 on the output side of the first amplifier 12 for the reason that the inherent noise in the network 14 is not initially amplified. If the signal-separating network 14 were placed ahead of, or in other words in the input circuit, of the amplifier 12, the latter would amplify not only the wanted signal but the unwanted noise in the signal-separation network. According to this invention, however, this noise is not initially amplified.

Inasmuch as UHF signals require more amplification than VHF signals because of subsequent losses in transmission to the television set, this circuit provides a convenient means for amplifying only the UHF component and peaking the gain of the UHF amplifier without any requirements for handling any VHF signals. By the same token, the VHF signals do not require as much amplification, so they are fed to the output circuitry 20 from the first amplifier 12. Thus, the UHF signals are amplified by two stages of amplification while the VHF by only one.

The signals arriving at the television receiver are therefore of higher signal-to-noise ratio than would be true if the signal-separation network 14 were located ahead of the amplifier 12. Furthermore, the UHF signals receive double amplification which is so important in the provision of proper level UHF signals to the television receiver.

In a working embodiment of this invention, the various components of the amplifier shown in FIG. 2 have been used. However, it should be understood that this invention is not limited to use of these particular components and may be varied to suit design requirements without departing from the spirit and scope of this invention.

| Reference numerals | Component Values |
|---|---|
| Capacitor **24** | 50 pf. |
| Capacitor **76** | 7.5 pf. |
| Capacitor **46** | 0.001 mfd. |
| Capacitor **34** and **35** | 0.001 mfd. |
| Capacitors **38** and **40** | 3.9 pf. |
| Capacitor **52** | 50 pf. |
| Capacitor **56** | 2.2 pf. |
| Capacitor **74** | 50 pf. |
| Capacitor **75** | 0.005 mfd. |
| Capacitor **72** | 250 mfd. |
| Capacitor **21** | 0.001 mfd. |
| Resistor **26** | 4,700 ohms |
| Resistor **28** | 2,200 ohms |
| Resistors **30** and **32** | 330 ohms |
| Resistor **51** | 560 ohms |
| Resistor **70** | 150 ohms |
| Inductors **48** and **66** | 19½ turns of No. 22 Copper Wire, I.D. three-sixteenths inch, approximate pitch 36 turns per inch |

Table – Continued

| | |
|---|---|
| Inductor **42** | 2 turns No. 22 Copper Wire, I.D. one-eighth inch, approximate pitch 16 turns per inch |
| Inductor **79** | 9½ turns No. 22 Copper Wire, I.D. one-fourth inch, approximate pitch 36 turns per inch |
| Inductor **54** | 5½ turns No. 22 Copper Wire, I.D. one-eighth inch, pitch 7½ turns per inch, end leads three-sixteenths inch and three-fourths inch, respectively |
| Inductor **50** | 6½ turns No. 22 Copper Wire, I.D. three-sixteenths inch, pitch 7½ turns per inch, end leads three-eighths inch long |
| Inductor **44** | 15½ turns No. 22 Copper Wire, I.D. one-eighth inch, pitch 36 turns per inch, leads three-sixteenths inch and three-fourths inch long |
| Q1, Q2 | RCA–2N3478 |
| Inductor **36** | Lead inductance |
| Rectifier **68** | Silicon diode EDAL BIG 5 |

While there have been described above the principles of this invention in connection with specific apparatus, it is to be clearly understood that this description is made only by way of example and not as a limitation to the scope of the invention.

What I claim is:

1. Apparatus for amplifying UHF and VHF television signals comprising a first radiofrequency amplifier of said signals having input and output circuits, means for coupling a VHF-UHF antenna system to the input circuit of said first amplifier, said first amplifier including a transistor and providing amplified UHF and VHF signals in the output circuit thereof, signal-separating means connected to said output circuit and including two circuits which are selective of said UHF and said VHF frequencies, respectively, a second radiofrequency amplifier having input and output circuits, said second amplifier providing amplified UHF signals in the output circuit thereof, said UHF frequency selective circuit being series-connected between the collector and base of the first and second amplifiers, respectively, and including a filter circuit which presents a low impedance to UHF signals but high impedance to VHF signals, said VHF frequency selective circuit being series-coupled between the collectors of said amplifiers, respectively, and including a filter which presents a high impedance to UHF signals but low impedance to VHF signals, a signal-combining circuit connected to the VHF frequency selective circuit and the output circuit of said second amplifier, and terminal means connected to said signal-combining circuit for applying signals at said two different frequencies to a radio frequency transmission line, the collector of said second amplifier being coupled to said terminal means, said terminal means including means for matching the impedances of said second amplifier circuit and said VHF frequency selective circuit to said transmission line.

2. The apparatus of claim 1 in which said second amplifier includes a circuit tuned to the UHF spectrum whereby the gain in UHF amplification exceeds that for other frequencies.

3. The apparatus of claim 2 in which said tuned circuit in the second amplifier includes an inductor connected in series with the collector thereof, a capacitor connected between the last-mentioned inductor and said terminal means, said VHF circuit being connected to the junction between said last-mentioned capacitor and said terminal means.

4. The apparatus of claim 3 in which the antenna system coupling means is a balun having two terminals for connection to an antenna and other terminals for connection to the base of the first amplifier, said terminal means includes a balun having two terminals for connection to a two-lead transmission line, and means for supplying operating potentials so said amplifiers.

UNITED STATES PATENT OFFICE
CERTIFICATE OF CORRECTION

Patent No. 3,614,628 Dated October 19, 1971

Inventor(s) Robert S. Ringland

It is certified that error appears in the above-identified patent and that said Letters Patent are hereby corrected as shown below:

<u>IN THE SPECIFICATION</u>

Column 1, Line 6 - delete "Of the Prior Art" and insert in its place ---antennas, and more---
Column 2, Line 51 - change "40" to ---50---
Column 3, Line 7 - change "Capacitor" to ---Capacitors---

Signed and sealed this 9th day of May 1972.

(SEAL)
Attest:

EDWARD M.FLETCHER,JR.
Attesting Officer

ROBERT GOTTSCHALK
Commissioner of Patents